United States Patent [19]

Schrewelius

[11] 4,016,313
[45] Apr. 5, 1977

[54] HEAT RESISTANT MATERIAL

[75] Inventor: Nils G. Schrewelius, Hallstahammar, Sweden

[73] Assignee: Bulten-Kanthal Aktiebolag, Sweden

[22] Filed: July 28, 1975

[21] Appl. No.: 599,750

[30] Foreign Application Priority Data

July 29, 1974 Sweden .............................. 7409758

[52] U.S. Cl. ................................ 428/35; 106/44; 432/253; 432/241; 432/258
[51] Int. Cl.² ......................................... C04B 35/56
[58] Field of Search ............ 106/44; 432/258, 253, 432/241; 428/35

[56] References Cited

UNITED STATES PATENTS

| | | | |
|---|---|---|---|
| 1,846,614 | 2/1932 | Rowland | 432/253 |
| 2,637,091 | 5/1953 | Nicholson | 106/44 |
| 3,228,084 | 1/1966 | Coleman et al. | 432/253 X |
| 3,246,275 | 4/1966 | Schrewelius | 106/44 X |
| 3,377,670 | 4/1968 | Davis | 432/241 |
| 3,492,153 | 1/1970 | Ervin | 106/44 |
| 3,649,342 | 3/1972 | Bartlett | 106/44 X |
| 3,852,099 | 12/1974 | Prochazka | 106/44 |

Primary Examiner—Ralph S. Kendall
Attorney, Agent, or Firm—Hill, Gross, Simpson, Van Santen, Steadman, Chiara & Simpson

[57] ABSTRACT

A heat resistant material comprising a recrystallized (self bound) skeleton of silicon carbide the pores of which are filled by infiltration of a heat resistant infiltration material, such as a silicon-molybdenum disilicide composition, so that the porosity is less than 5 % and preferably less than 2 %, the composition of the final material being such that the bending strength thereof at room temperature is at least 5 kp/mm², and preferably above 10 kg/mm², such as of the order of 20 kp/mm².

5 Claims, 6 Drawing Figures

HEAT RESISTANT MATERIAL

BACKGROUND OF THE INVENTION

1. Field of the Invention

This invention relates to a heat resistant material. Particularly the heat resistant material according to the invention is useful as kiln furniture in firing kilns and the like.

2. Prior Art

Kiln furniture as presently used in firing kilns for firing porcelain and similar goods, for instance, generally consists of refractory plates or slabs, e.g. 25–35 millimeters thick silicon carbide slabs. The slabs which support the goods to be fired are placed one above the other on tunnel kiln cars and are held mutually spaced by means of tubes or so-called "elephant feet". More often than never the refractory slabs have a weight of more than 50 kilograms, and thus they are very cumbersome to handle. The weight ratio of the kiln furniture to the goods to be fired sometimes reaches the order of 2:1. Of course, this means a tremendous energy waste. Another drawback inherent with the silicon carbide kiln furniture as used hitherto is that the strength thereof as time passes by is decreased due to oxidation. Still another drawback, in connection with the firing of porcelain, is that the porcelain goods may tend to stick to the carbide, unless the upper surface of the refractory plate is provided with a surface coating, such as an aluminum paint.

In an attempt to remedy the just mentioned drawbacks it has been proposed to use a special recrystallized, high purity silicon carbide (99% purity) composition. Also, it has been proposed to use an alumina - silicon carbide composition. In both cases, however, the material is a firebrick-like one which has a comparatively low bending strength and which, hence, must be comparatively thick to ensure the required supporting power. Further, with the known refractory slabs, problems have been encountered in avoiding sagging and/or warping of the slabs.

SUMMARY OF THE INVENTION

According to the invention there is provided a heat resistant material comprising a recrystallized (self bound) skeleton of silicon carbide the pores of which are filled by infiltration of a heat resistant infiltration material so that the porosity is less than 5% and preferably less then 2%, the composition of the final material being such that the bending strength thereof at room temperature is at least 5 kp/mm$^2$, and preferably above 10 kp/mm$^2$. Advantageously, the bending strength may be on the order of 20 kp/mm$^2$.

Special advantages with respect to the thermal shock resistance are achieved if the recrystallized silicon carbide skeleton prior to the infiltration step has a porosity on the order of up to about 30–35%, preferably about 20%.

The infiltration material may comprise at least one constituent from a group comprising oxides, silicides, nitrides, borides, and carbides, such as molybdenum disilicide, MoSi$_2$.

For economy in manufacture, for instance, the infiltration material may comprise silicon up to the order of 70%, as a maximum, preferably about 60%, as a maximum, with the remainder of the infiltration material being essentially molybdenum disilicide, MoSi$_2$. However, extremely good values as to long service life at very elevated temperatures, high thermal shock resistance, close tolerances and high bending strength have been achieved with an infiltration material comprising about 10% silicon and about 90% molybdenum disilicide, MoSi$_2$.

The infiltration material may comprise aluminum atoms, preferably to a sufficient amount to permit the development of a superficial oxide layer containing Al$_2$O$_3$ and SiO$_2$, on oxidation of the infiltrated material body.

DESCRIPTION OF PREFERRED EMBODIMENTS

Figure 1:
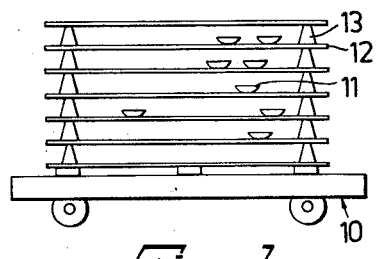
FIG. 1 illustrates schematically the setting of goods to be fired on a tunnel kiln car by means of kiln furniture according to the invention.

The tunnel kiln car 10 as shown in FIG. 1 carries a load 11 to be fired, e.g. in the form of porcelain dinnerware in seven floors, one above the other, each floor comprising a supporting slab 12 of the heat resistant material according to the invention. The slabs 12 are held spaced at desired heights, slightly more than the heights of the individual porcelain items, by means of so-called elephant's feet 13 which preferably likewise consist of the heat resistant material according to the invention.

Figure 2:
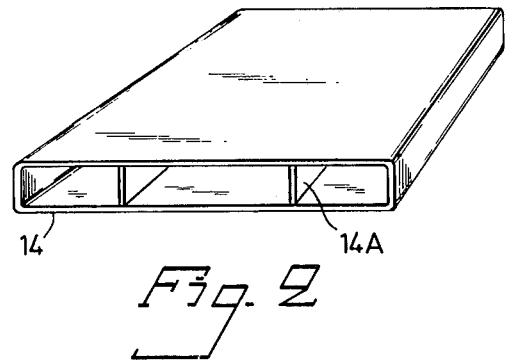
FIG. 2 is a schematic perspective view of a tube profile of rectangular cross-section which is useful for the manufacture of kiln furnace.

The tube profile 14 as shown in FIG. 2 may have a width on the order of 100 mm, for instance, and a height on the order of 20 mm, for instance. The wall thickness may be on the order of 1–5 mm, and is preferably about 2 mm in the case shown. The length of the tube profiles of rectangular cross-section may be about 0.5 meters, but they may even be longer, if desired.

Figure 3:
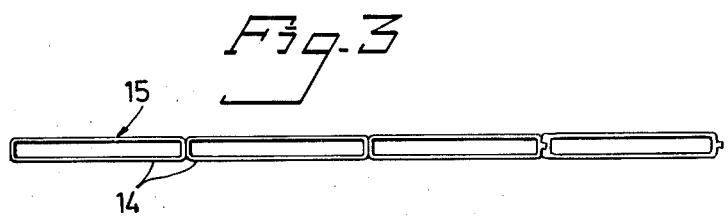
FIG. 3 is an end view of a portion of a slab, made from interconnected tube profiles according to FIG. 2.

FIG. 3 shows that a slab 15, corresponding to the slab 12 in FIG. 1, may be manufactured from plurality of tube profiles of the kind in FIG. 2, which are placed side by side and suitably bonded together, such as by means of a very heat resistant adhesive. The bond may be improved in that the smaller sides of the tube profiles are provided with interconnecting means, such as tongues and grooves. It is also possible to provide the smaller sides of the tube profiles with notches wherein interconnecting tongues are inserted as the profiles are to be connected to each other.

For certain applications, it may be advantageous to divide the rectangular tube profiles longitudinally in a plane midway between the two wider sides. If the tube profiles 14 are divided in this way at a suitable stage of the manufacture and are then jointed together along the shorter sides, then a slab is obtained the upper surface of which is essentially, flat and the under surface of which has a plurality of stiffening flanges, each having a height corresponding to half the profile thickness and a width corresponding to about twice the wall thickness of the tube profile. Of course, there is nothing to prevent the tube wall thicknesses from being different at the wider and narrower sides of the tube profile, respectively. Also, it is possible to provide the tube profiles, on the manufacture thereof, with internal stiffening webs 14A, as shown only in FIG. 2. Such webs 14A may extend all the way between the wider upper and lower walls of the tube profile in question, but they may also be made to occupy a smaller part only of the free cross-section of the tube.

Figure 4:
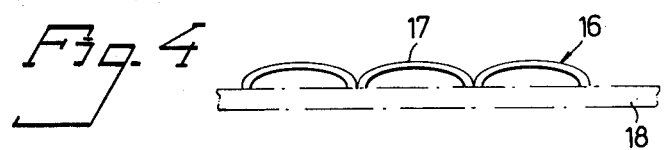
FIG. 4 is an end view of a portion of a slab, made from longitudinally split tube profiles of an oval cross-section.

FIG. 4 shows a slab 16 composed of profiles 17, each one being the half of tube profile of oval cross-section which has been divided longitudinally in a plane containing the major axis of the oval. Due to the oval cross-sectional shape a desirable contact surface for the goods, such as porcelain household wares, is obtained on the upper side of the slab, as contrasted to the marked line contact which would be obtained in case the tube profile has a circular cross-section. It should be realized that the slab 16 of FIG. 4 could also be manufactured from full tube profiles, which are not divided longitudinally, and also that the considerations made above with respect to the slab in FIG. 3 are equally applicable to the slab in FIG. 4.

FIG. 4 also shows, in phantom lines, a profile 18 which runs transversely to the profiles 17 to increase the stability of the slab. Of course, any desired number of such profiles 18 may be used, suitably spaced mutually. Further, it would also be possible to make a slab from a combination of different profiles, such as an upper plane from longitudinally divided or split tube profiles of the type as shown in FIG. 1, and a lower reinforcing or stiffening plane from tube profiles of circular cross-section, for instance, which are suitably spaced mutually, longitudinally of the uppermost profiles.

Figure 5:
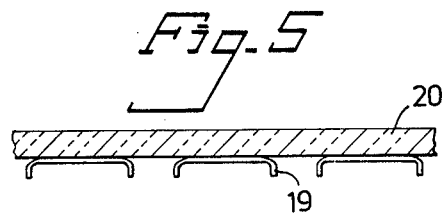
FIG. 5 is a part-sectional end view of a slab which is useful as kiln furniture and wherein the heat resistant material according to the invention is used as supporting means.

FIG. 5 illustrates profiles 19 arranged as a supporting structure for a plate 20 of a second heat resistant material, having lower bending strength and heat resistant values than those of the profiles 19. The profiles 19 are shown slightly spaced mutually but they could also be disposed side by side.

Figure 6:
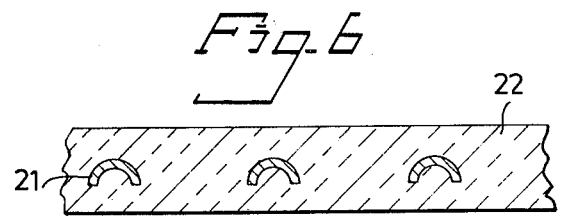
FIG. 6 is a part-sectional end view of a slab which comprises the heat resistant material according to the invention as a supporting and stabilizing reinforcement.

FIG. 6 illustrates profiles 21 forming a reinforcing skeleton in a plate 22 of heat resistant material.

The invention has been discussed above with reference had to the use of the heat resistant material for kiln furniture. It should be realized, however, that the material in question also has many other valuable usages, such as to form linings for rollers, to form muffles, and generally where a highly heat resistant material of long service life at very elevated temperatures, high thermal shock resistance, close tolerances, no reaction with product, negligible reheat shrinkage and high oxidation resistance are essential requirements.

What I claim is:

1. A heat resistant fixture for use in firing kilns comprising a porous skeleton of self-bonded silicon carbide, the pores of which are substantially filled with an impregnant containing molybdenum disilicide and from 10 to 60% by weight silicon, said fixture being hollow and having a supporting surface formed thereon.

2. The fixture of claim 1 in which said impregnant also contains aluminum.

3. The fixture of claim 1 which has a major dimension substantially greater than a minor dimension perpendicular to said major dimension.

4. The fixture of claim 3 in which said fixture has partitioned walls dividing the hollow interior of said fixture into elongated passages.

5. The fixture of claim 3 in which said fixture has a wall thickness on the order of 1 to 10 mm.

* * * * *